United States Patent [19]
Shih

[11] Patent Number: 5,382,075
[45] Date of Patent: Jan. 17, 1995

[54] CHAIR SEAT WITH A VENTILATION DEVICE

[75] Inventor: Chao C. Shih, Taipei, Taiwan, Prov. of China

[73] Assignee: Champion Freeze Drying Co., Ltd., Taipei, Taiwan, Prov. of China

[21] Appl. No.: 138,920

[22] Filed: Oct. 19, 1993

[51] Int. Cl.⁶ .............................................. A47C 7/72
[52] U.S. Cl. ...................... 297/180.14; 297/180.11
[58] Field of Search .......... 297/180.1, 180.11, 180.12, 297/180.13, 180.14, 217, DIG. 3, 452.21, 452.29, 452.42, 452.43, 452.44

[56] References Cited

U.S. PATENT DOCUMENTS

| | | | |
|---|---|---|---|
| 2,742,957 | 4/1956 | Young | 297/452.42 |
| 3,030,145 | 4/1962 | Kottemann | 297/180.11 |
| 3,681,797 | 8/1972 | Messner | 297/180.13 X |
| 4,981,324 | 1/1991 | Law | 297/180.11 |
| 5,002,336 | 3/1991 | Feher | 297/180.13 |
| 5,004,294 | 4/1991 | Lin | 297/180.11 |
| 5,163,737 | 11/1992 | Navach et al. | 297/452.29 X |

FOREIGN PATENT DOCUMENTS 0637851  3/1962  Canada ............................. 297/180.1

Primary Examiner—Peter R. Brown
Assistant Examiner—Milton Nelson, Jr.
Attorney, Agent, or Firm—W. Wayne Liauh

[57] ABSTRACT

A chair seat with a ventilation device, which is a cubic and gridiron-shaped structure. The chair seat includes a plurality of air guide plates, a slip-proof cover; the connector of one end of the ventilation hose office air-blowing trait is connected with the vent port of the slip-proof cover, while the other end connector is connected with the air outlet of the fan so as to direct an air stream to flow into the chair seat to circulate, and then a driver in the chair seat can feel cool and comfortable.

4 Claims, 7 Drawing Sheets

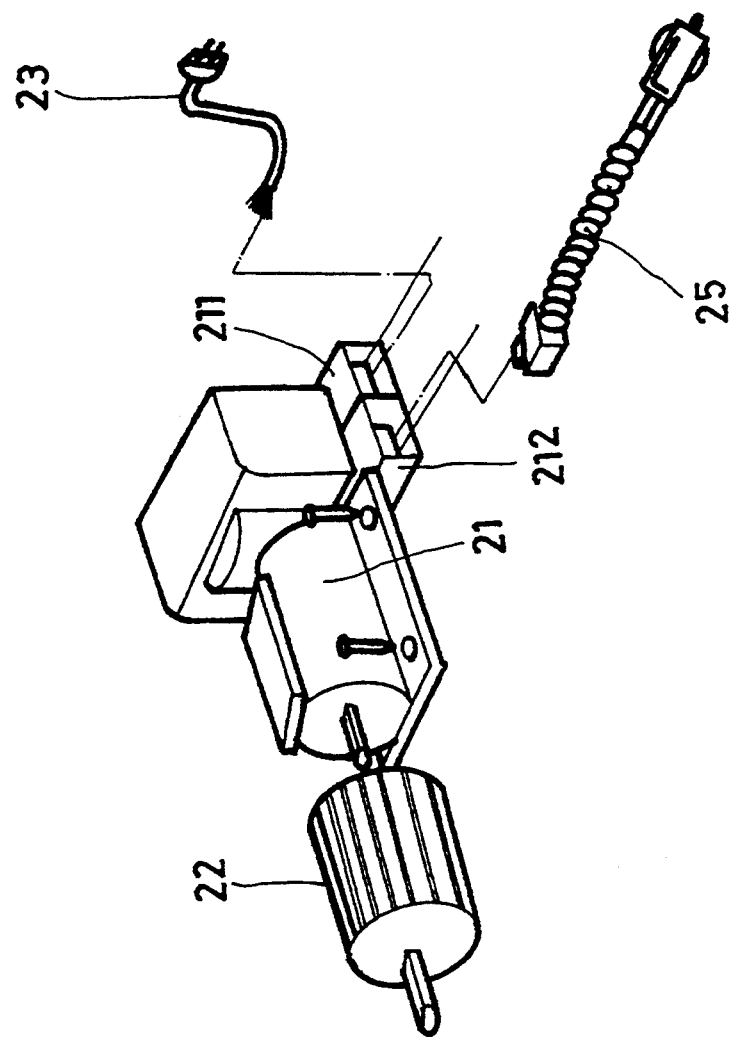
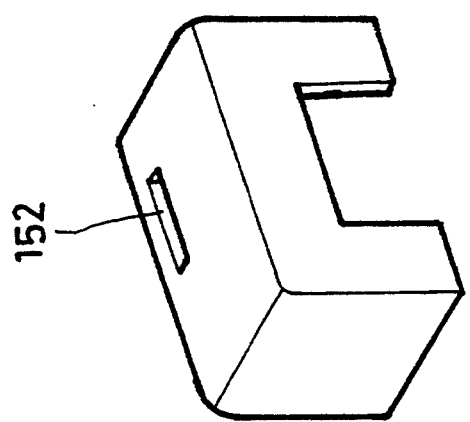
FIG. 3

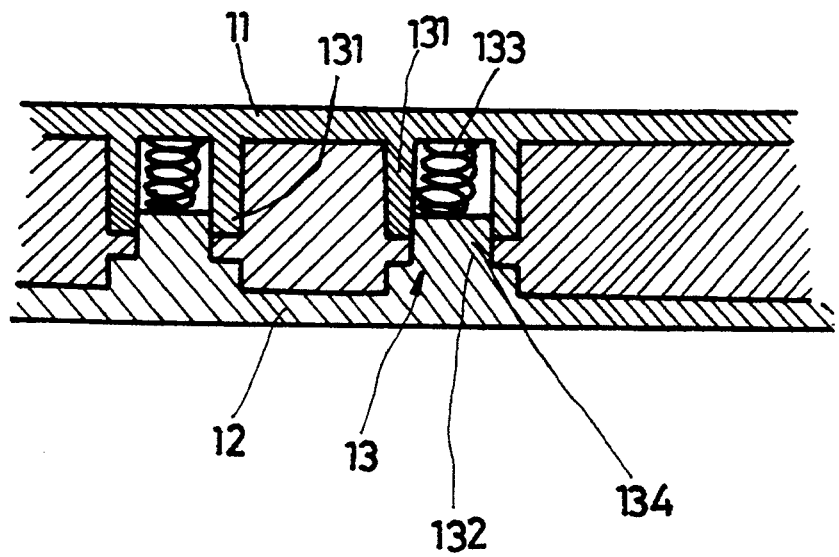
F I G. 4
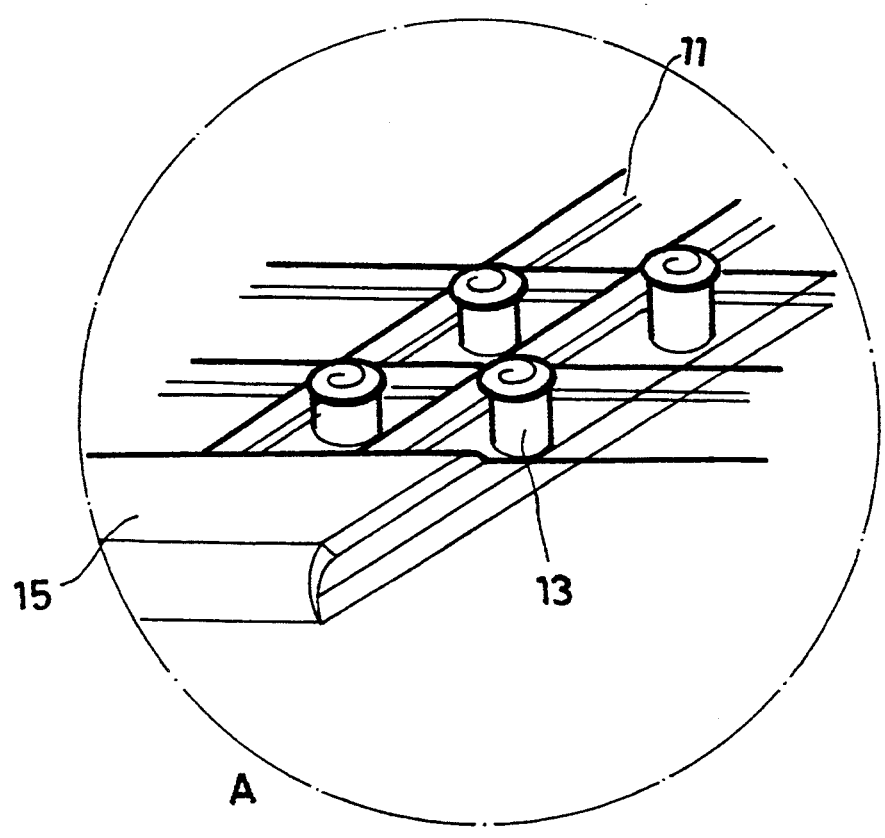
F I G. 9

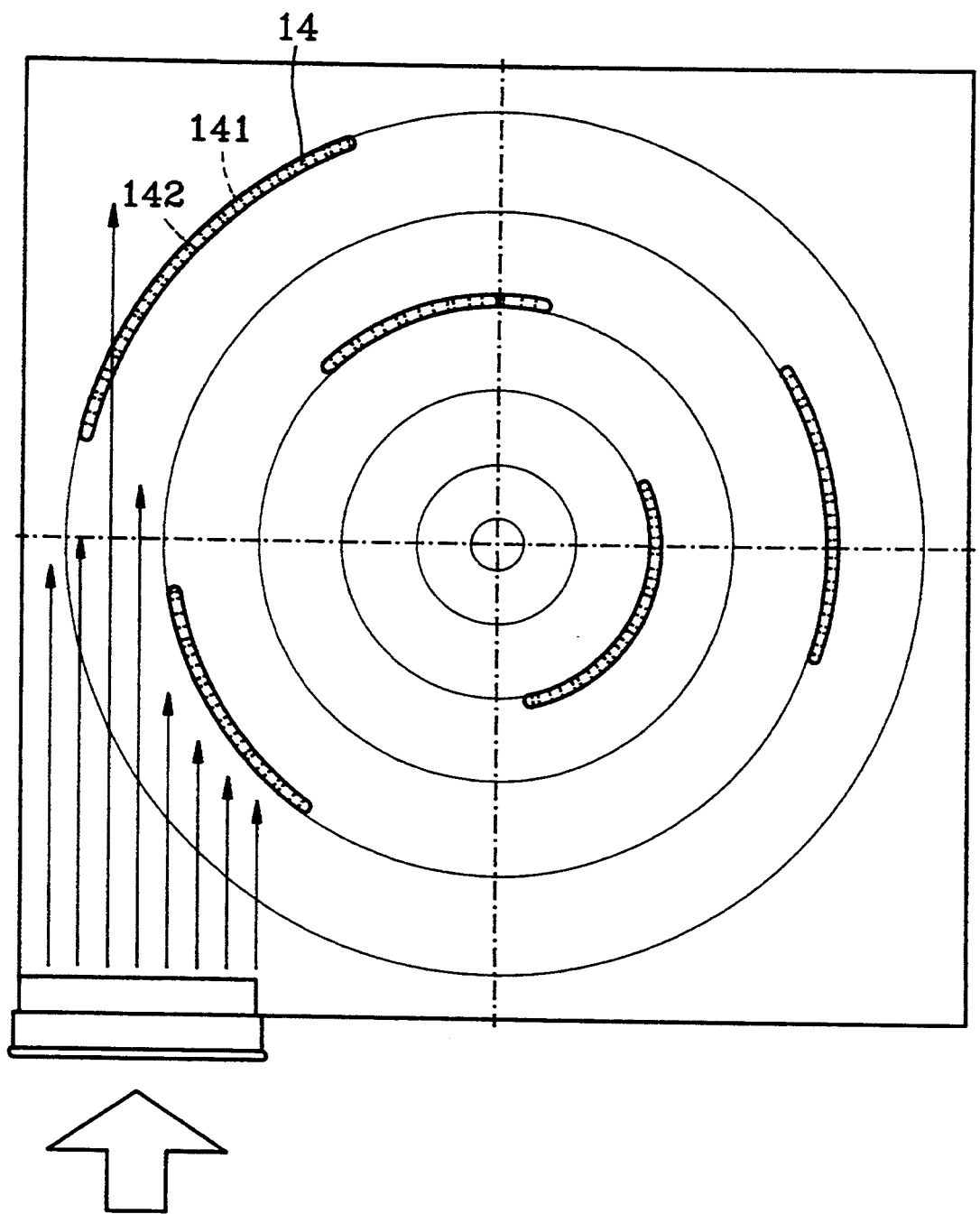
F I G.5

CHAIR SEAT WITH A VENTILATION DEVICE

BACKGROUND OF THE INVENTION

The current and conventional chair seats have the drawbacks of having limited ventilation. being muggy, or feeling uncomfortable because of heat being accumulated under the seat: of a user. Such heat might cause a user to suffer from eczema or hemorrhoids, edema or dermatitis, etc. Such a painful ordeal is also caused by the narrow seat in a car and long driving. The driver has no way to move or change seat positions for even a short time of ventilation.

SUMMARY OF THE INVENTION

This invention relates to a chair seat with a ventilation device, and particular to a chair seat having a cubic and gridiron-shaped structure. The inside of the chair seat is mounted with a plurality of air guide plates, while the outside thereof is mounted with a slip-proof cover; one connecting terminal of the ventilation hose of the air-blowing unit is commeted with the vent port of the slip-proof cover, while the other connecting ternfinal thereof is connected with the air outlet of the fan so as to guide an air stream into the chair seat. The prime feature of the present invention is to have an air stream circulated hi the seat, and to have a user feel cool and comfortable.

Another feature of the present invention is that the air-blowing unit includes a ventilation hose, a motor and a fan; the ventilation hose is a stretchable hose to fit a position installed; the ventilation hose can simply be connected with the vent port of the slip-proof cover.

Still another feature of the present invention is that the chair seat has a top layer and a bottom layer, between which a plurality of mid-supporting posts are furnished; each mid-supporting post has a spnng therein to provide a stretchable structure so as to have an air stream in the chair seat maintained a continuous circulation condition.

A further feature of the present invention is that a plurality of air guide plates are mounted regularly between the top layer and the bottom layer of the chair seat; each air guide plate has a plurality of air vents to enable air stream to flow along the air guide plate and to flow through the air vents so as to obtain a better circulation result.

A further feature of the present invention is that the power supply thereof is the ordinarv commercial power used in a house. If the device is used in a car, the device can use the car battery as a power supply.

BRIEF DESCRIPTION OF THE DRAWINGS

FIG. 3 illustrates an air-blowing unit in the ventilation device of a chair seat according to the present invention.

FIG. 4 is a sectional view of the ventilation device of a chair seat according to the present invention.

FIG. 5 illustrates the arrangement of the air guide plates in the ventilation device of the chair seat according to the present invention.

FIG. 9 is an enlarged view ofa fragmental internal structure of the chair seat according to the present invention.

DETAILED DESCRIPTION

Figure 1:
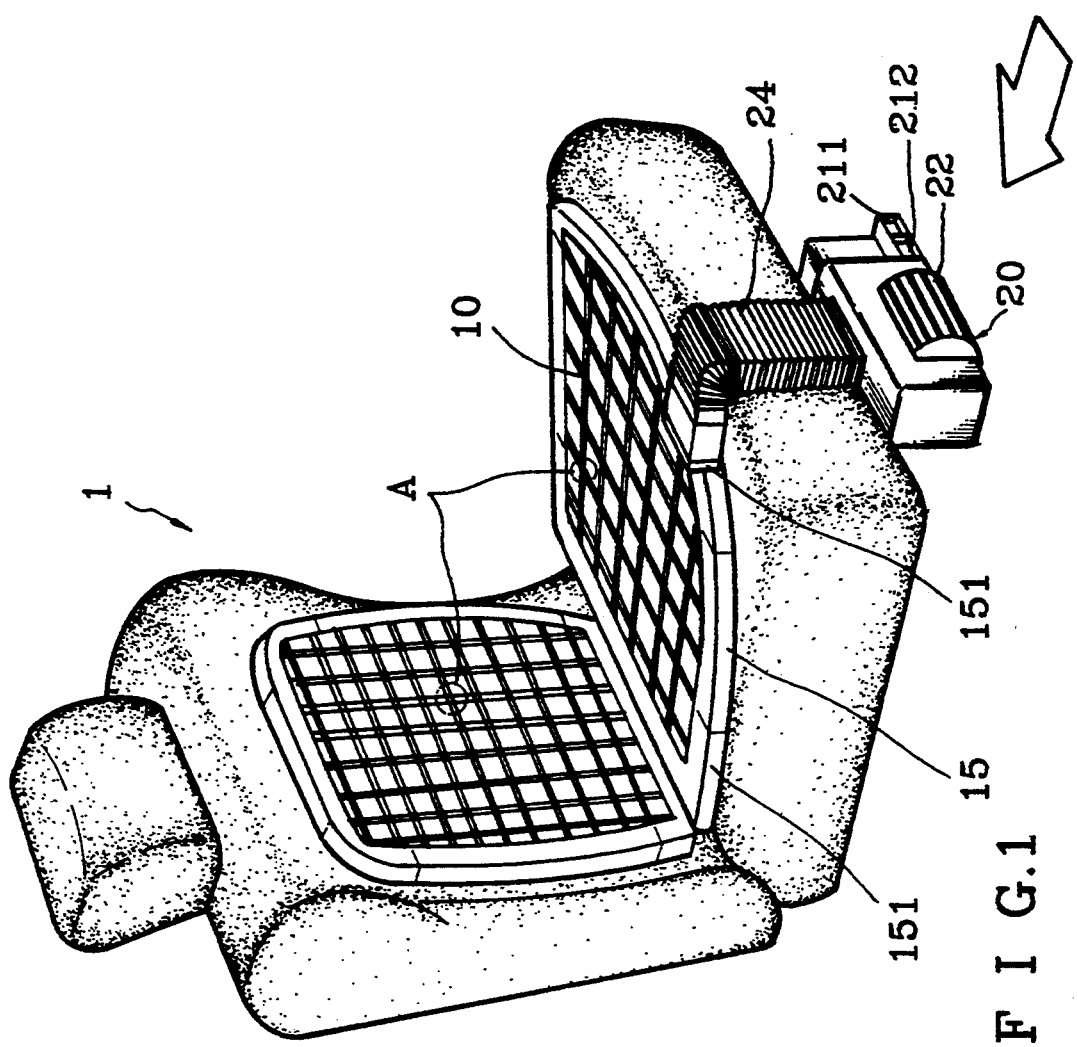
FIG. 1 is a perspective view of a chair seat with a ventilation device according to the present invention.
Figure 6:
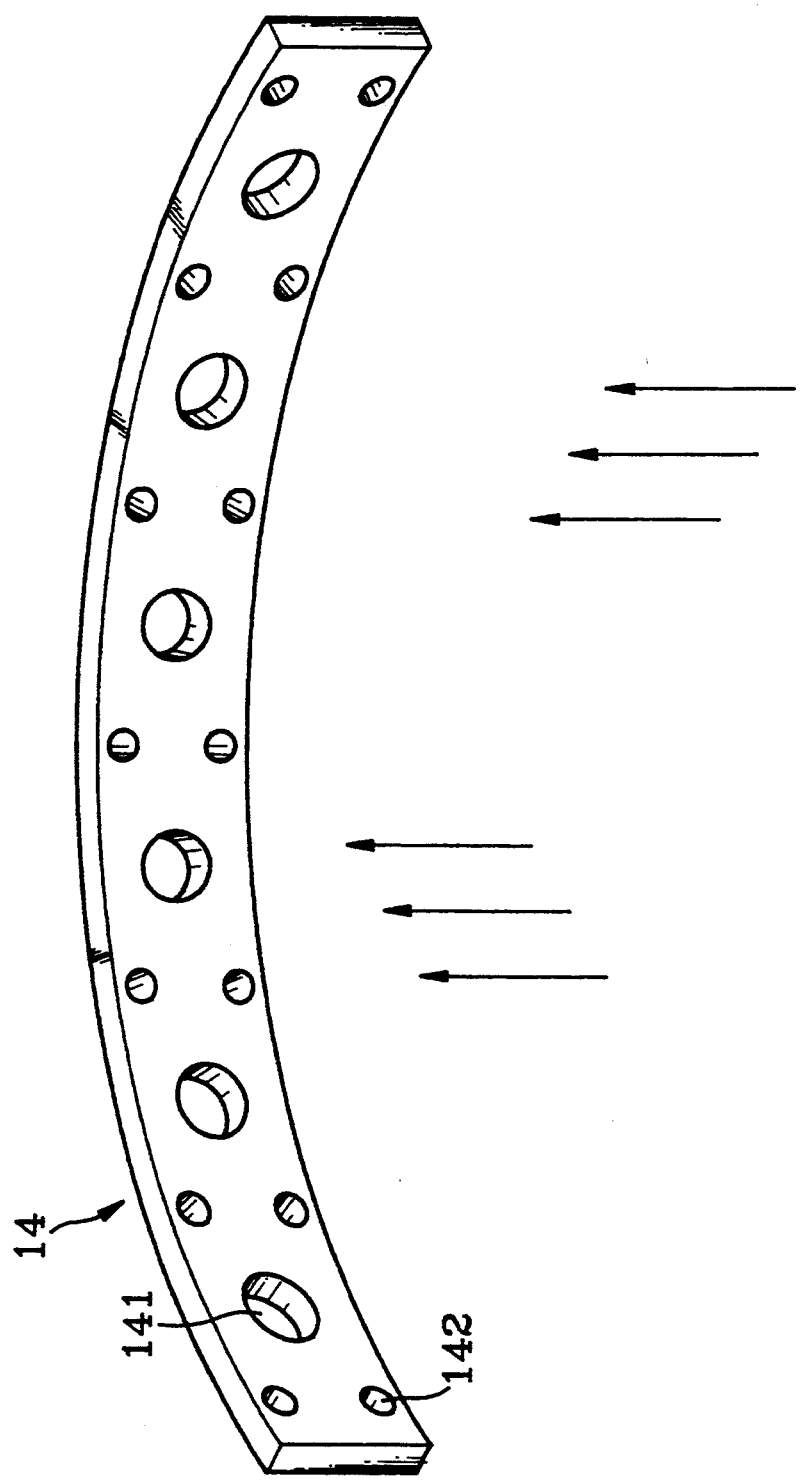
FIG. 6 is a perspective view of an air guide plate in the ventilation device of a chair seat according to the present invention.

Referring to FIG. 1, the ventilation device 1 of a chair seat of an embodiment according to the present invention comprises a chair seat 10 and an air-blowing unit 20. The chair seat 10 is a cubic and gridiron-shaped structure made of a soft PE (poly ethylene) material; the chair seat 10 includes a top layer 11 (as shown in FIGS. 4 and 9). a bottom layer 12, a plurality of mid-supporting posts 13, a plurality of air guide plates 14 and a slip-proof cover 15; the cover 15 is also used for preventing the air from leaking out of the chair seat. The top layer 11 and the bottom layer 12 are fixedly attached to the slip-proof cover 15 in an opposite rammer. The mid-supporting post 13 is a cylindrical post as shown in FIG. 4; each post 13 includes a hollow upper post 131, a solid lower post 132 and a spring 133. The lower post 132 has a salient part 134, by which the spring 133 is held in the hollow upper post 131 to provide a stretchable structure. The air guide plates 14 as shown in FIG. 5 are curved plates, being fastened around the center of the chair seat and between the top layer 11 and the bottom layer 12 of the chair seat. Each plate 14 has a plurality of air vents 141 and 142 which are different in size as shown in FIG. 6. A portion oftlie air stream in the chair seat flows through the air vents 141 and 142, while the other portion of the air stream flows along the curved surthce to circulate before being exhausted outwards or upwards so as to obtain a better ventilation result without becoming a saturation condition.

The slip-proof cover 15 is tightly connected with the top layer 11 and the bottom iayer 12 along the outer edge of the chair seat; the outer edge of the slip-proof cover 15 is furnished with several vent ports 151 to facilitate air circulation or connection with a connecting terminal 27 of the ventilation hose 24 in the air-blowing unit 20 (the connecting terminal 27 can be fitted with any vent port 151 in the slip-proof cover 15, i.e., the position thereof is not limited.)

As shown in FIGS. 1 and 3, the air-blowing unit of the ventilation device is shown with a disassembled view, in which the trait 20 includes a motor 21, a ventilation hose 24 and a fan 22; the motor 21 is furnished with an ordinary. power socket 211 mid an extension cable socket 212; the socket 211 is used for connecting a normal power plug 23, while the extension cable socket 212 is used to connect the cigarette lighter connecting plug 25 in a car. For indoor use, the socket 212 can be connected with a normal power plug 23. For car use, the cigarette lighter connecting plug 25 can be connected. The connecting terminal 27 of the ventilation hose 24 as shown in FIG. 8 is to connect with a vent port 151, while the other connecting terminal 28 is to connect with an air outlet 152.

Figure 8:
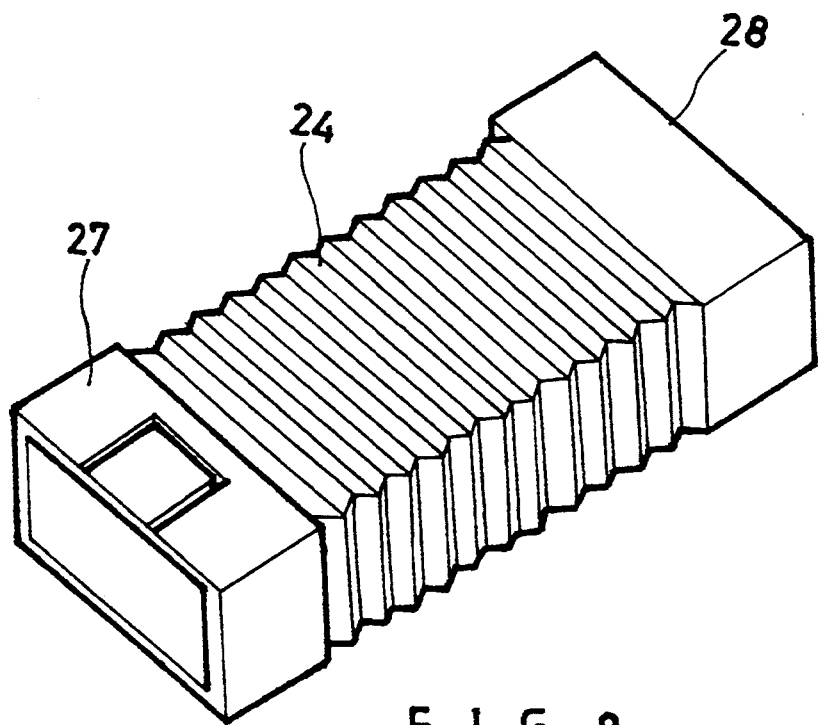
FIG. 8 is a perspective view oftlie ventilation hose of the ventilation device according to the present invention.

When the power supply is tunled on, the motor 21 will turn to drive the fan 22 to produce an air stream. which flows through the ventilation hose 24 (as shown in FIG. 8), the vent port 151 and into the chair seat; then, the air stream flows through the air guide plates 14 and the air vents 141 and 142, and then flows through the vent ports 151 of the slip-proof cover 15 so as to have the air stream flowed and circulated in the chair seat. and to drive the hot air out of the chair seat completely.

Figure 2:
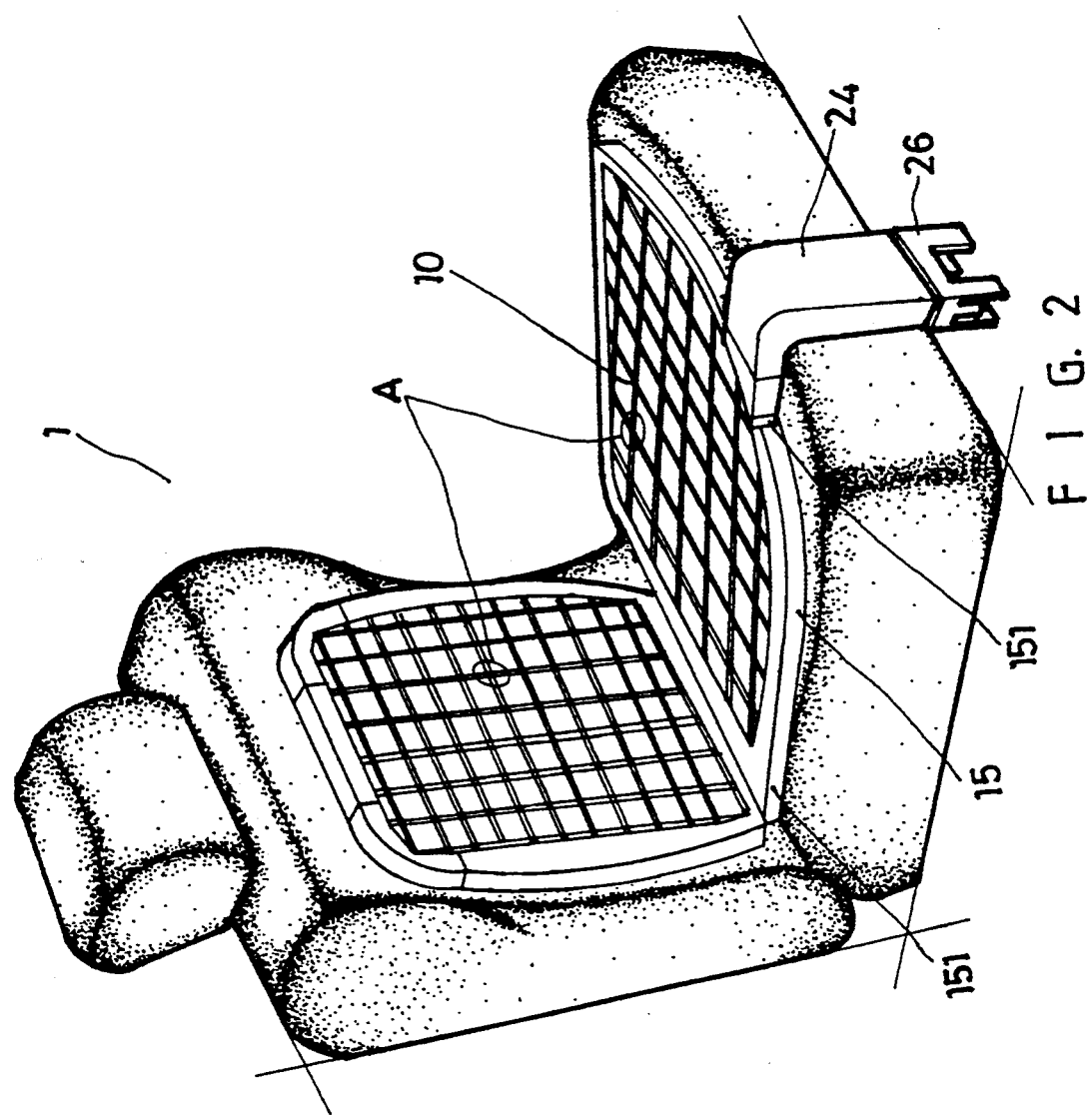
FIG. 2 is a perspective view of another embodiment of the chair seat with a ventilation device according to the present invention.
Figure 7:
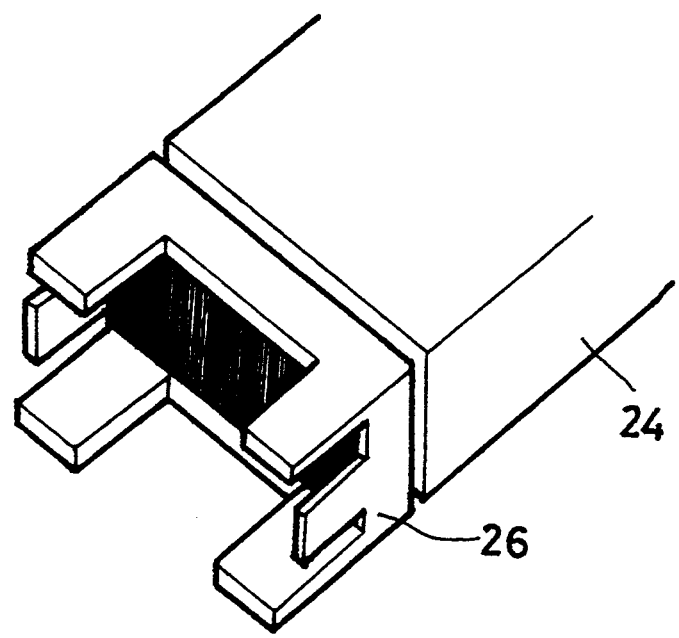
FIG. 7 is a perspective view of a cool air connector of the vent hose in the ventilation device to be connected with the air conditioner outlet of a car.

FIG. 2 illustrates another embodiment of the present invention, which is primarily used in a car to connect with the air conditioner outlet thereof; the feature of the embodiment is that one end of the ventilation hose 24 is furnished with an air conditioner connector 26 (as shown in FIG. 7), which is designed to fit to the air conditioner outlet, i.e., the connector 26 can directly plug into the air conditioner outlet of a car so as to facilitate a cool air to flow into the chair seat through the ventilation hose 24 to cool the chair seat; in that case, the motor 21 and the fan 22 will be omitted, but the cool result would still affect the seat and the car.

I claim:

1. A chair seat with a ventilation device comprising a chair seat and an air-blowing unit; said chair seat being a cubic and gridiron-shaped structure, and comprising a top layer, a bottom layer, a plurality of mid-supporting posts, a plurality of air guide plates, and a slip-proof cover; said mid-supporting posts being fixedly connected with said top layer and said bottom layer as supporting means; each said mid-supporting post including a hollow upper post, a solid lower post and a spring; said spring being mottoted in said hollow upper post with a salient part of said lower post to form a stretchable structure; said air guide plates being in curved shape, and each having a plurality of air vents; said air guide plates being mounted in said chair seat to enable air to circulate smoothly; said slip-proof cover being fixedly connected with said top layer and said bottom layer, and having several vent ports between said top and bottom layers; said air-blowing refit including a ventilation hose, a motor and a fan; said ventilation hose being a stretchable hose, of which one end being connected with a vent port on said slip-proof cover, and the other end thereof being connected with an air outlet of said fan.

2. A chair seat with a ventilation device as claimed in claim 1, wherein said motor is adapted to be powered by a general commercial power supply.

3. A chair seat with a ventilation device as claimed in claim 1, wherein said ventilation hose having a connecting terminal, which is also a connector to an air conditioner.

4. A chair seat with a ventilation device as claimed in claim 1, wherein said motor is adapted to be powered by a car battery.

* * * * *